Patented Apr. 5, 1932

1,852,788

UNITED STATES PATENT OFFICE

PAUL I. MURRILL, OF EAST NORWALK, CONNECTICUT, ASSIGNOR TO R. T. VANDERBILT COMPANY, INCORPORATED, OF NEW YORK, N. Y., A CORPORATION OF NEW YORK

MINERAL OIL COMPOSITIONS

No Drawing. Application filed March 4, 1930. Serial No. 433,180.

This invention relates to an improved mineral oil or grease composition. The composition includes in addition to the oil or grease a small amount of a stabilizer which prevents or retards or inhibits the aging or certain of the results which ordinarily accompany the aging of mineral oils and greases.

According to this invention, oil or grease is stabilized by the addition of a small amount of a phenolate prepared from a phenyl phenol and a base, the base itself being a stabilizer for mineral oils and greases. The stabilizers of this invention include the phenolates resulting from the interaction of a phenyl phenol such as 2-hydroxy-diphenyl or 4-hydroxy-diphenyl with diphenylguanidine or triethanol amine or an alkylene diaryl diamine such as ethylene diphenyl diamine. Mixtures of such phenolates may be employed.

I do not claim the stabilization of mineral oil or grease by the addition of either a phenyl phenol or a base such as those mentioned. What I do claim as my invention is a stabilized mineral oil or grease composition comprising in addition to the oil or grease a phenolate prepared by the interaction of a phenyl phenol with such a base. I have found that by adding to a mineral oil suitable for saturating cable wrappings, for example, a few tenths of a percent of such a phenolate, the resistivity of the oil composition obtained does not decrease on aging to the same extent that the resistivity of oils and greases not so stabilized decreases. Further, the power factor of the stabilized composition does not increase on standing to the same extent that the power factor of oil not so stabilized increases.

Further, I have found that the phenolate prepared from 2-hydroxy-diphenyl and an alkylene diaryl diamine such as ethylene diphenyl diamine is somewhat better adapted for use as a cable saturant than the corresponding phenolate made from 4-hydroxy-diphenyl and an alkylene diaryl diamine such as ethylene diphenyl diamine.

The stabilizers contemplated by this invention, prepared by the interaction of a phenyl phenol with a base, have a different stabilizing effect from a mixture of the phenyl phenol and base and have melting points, etc. distinct from both the phenyl phenol and the base. This identifies them as distinct chemical compounds and they are referred to herein as phenolates. I have observed, for example, that the phenolate prepared by reacting 2-hydroxy-diphenyl with ethylene diphenyl diamine, has a higher melting point than either the hydroxy-diphenyl or the diamine. The phenolates which it is contemplated to use as stabilizers according to this invention, can be prepared by causing either 2-hydroxy-diphenyl or 4-hydroxy-diphenyl to react with diphenylguanidine or triethanol amine or an alkylene diaryl diamine such as ethylene, propylene, trimethylene, tetramethylene or pentamethylene diaryl diamine of which the aryl groups may be phenyl or substituted phenyl such as tolyl or naphthyl, etc.

In preparing the stabilized composition of this invention, the stabilizer may be dissolved in a low boiling organic solvent and the solution may then be added to the oil or grease. The solution is thoroughly stirred into the oil or grease and the solvent may then be volatilized by heating.

I claim:—

1. A stabilized oil or grease composition comprising an oil or grease of mineral origin and a small amount of a phenyl phenolate prepared by reacting a phenyl phenol with an organic chemical base having alkaline properties which itself stabilizes mineral oil and grease.

2. Stabilized mineral oil and grease compositions including in addition to the oil or grease a phenyl phenolate prepared by the interaction of a phenyl phenol with one member of the group comprising diphenylguanidine, triethanol amine and alkylene diaryl diamines.

3. Stabilized mineral oil and grease compositions including in addition to the mineral oil or grease a phenyl phenolate prepared by the interaction of a phenyl phenol with an alkylene diaryl diamine.

4. Stabilized mineral oil and grease compositions comprising in addition to the oil or grease a phenyl phenolate prepared by reacting a phenyl phenol with diphenylguanidine.

5. Stabilized mineral oil and grease compositions including in addition to the oil or grease a small amount of a phenyl phenolate prepared by reacting a phenyl phenol with triethanol amine.

6. A stabilized mineral oil composition suitable for saturating cable wrappings, including in addition to the oil a small amount of phenyl phenolate prepared by reacting 2-hydroxy-diphenyl with ethylene diphenyl diamine.

7. Stabilized mineral oil and grease compositions including in addition to the mineral oil or grease, a phenyl phenolate prepared by the interaction of 2-hydroxy-diphenyl with an alkylene diaryl diamine.

8. Stabilized mineral oil and grease compositions including in addition to the mineral oil or grease, a phenyl phenolate prepared by the interaction of 2-hydroxy-diphenyl with ethylene diphenyl diamine.

9. Stabilized mineral oil and grease compositions comprising in addition to the oil or grease, a phenyl phenolate prepared by reacting 2-hydroxy-diphenyl with an organic chemical base having alkaline properties which itself stabilizes mineral oil and grease.

10. Stabilized mineral oil and grease compositions comprising a phenyl phenolate prepared by reacting an hydroxy-diphenyl with an alkylol amine.

11. Stabilized mineral oil and grease compositions comprising a phenyl phenolate prepared by reacting a phenyl phenol with an organic chemical base having alkaline properties which itself serves to stabilize mineral oil and grease.

12. In a process of making a stabilized mineral oil or grease composition, the step which comprises adding to the mineral oil or grease a small amount of phenyl phenolate prepared by reacting a phenyl phenol with an alkylene diaryl diamine.

13. In a process of making a stabilized mineral oil or grease composition, the step which comprises adding to the mineral oil or grease a small amount of phenyl phenolate prepared by reacting a phenyl phenol with ethylene diphenyl diamine.

14. In a process of making stabilized mineral oil or grease compositions, the step which comprises adding to the mineral oil or grease a small amount of phenyl phenolate prepared by reacting a phenyl phenol with an alkylol amine.

15. In a process of making a stabilized mineral oil or grease composition, the step which comprises adding to the mineral oil or grease a small amount of phenyl phenolate prepared by reacting a phenyl phenol with triethanol amine.

16. In a process of making a stabilized mineral oil or grease composition, the step which comprises adding to the mineral oil or grease a small amount of phenyl phenolate prepared by reacting a phenyl phenol with diphenylguanidine.

In testimony whereof I affix my signature.

PAUL I. MURRILL.